US011334326B2

(12) United States Patent
Rodriguez-Velasquez et al.

(10) Patent No.: US 11,334,326 B2
(45) Date of Patent: May 17, 2022

(54) SYSTEMS, DEVICES, AND METHODS OF DEVELOPING OR MODIFYING SOFTWARE USING PHYSICAL BLOCKS

(71) Applicants: Adrian Andres Rodriguez-Velasquez, San Jose, CA (US); Ken Chhan, San Jose, CA (US)

(72) Inventors: Adrian Andres Rodriguez-Velasquez, San Jose, CA (US); Ken Chhan, San Jose, CA (US)

( * ) Notice: Subject to any disclaimer, the term of this patent is extended or adjusted under 35 U.S.C. 154(b) by 155 days.

(21) Appl. No.: 16/802,845

(22) Filed: Feb. 27, 2020

(65) Prior Publication Data

US 2020/0272429 A1 Aug. 27, 2020

Related U.S. Application Data

(60) Provisional application No. 62/811,445, filed on Feb. 27, 2019.

(51) Int. Cl.
| | |
|---|---|
| G06F 9/44 | (2018.01) |
| G06F 9/455 | (2018.01) |
| G06F 9/445 | (2018.01) |
| G06F 8/34 | (2018.01) |
| G06F 3/03 | (2006.01) |

(Continued)

(52) U.S. Cl.
CPC .............. *G06F 8/34* (2013.01); *G06F 3/0304* (2013.01); *G06F 3/165* (2013.01); *G06F 8/20* (2013.01)

(58) Field of Classification Search
CPC . G06F 8/34; G06F 8/20; G06F 3/0304; G06F 3/165
See application file for complete search history.

(56) References Cited

U.S. PATENT DOCUMENTS 9,158,389 B1 * 10/2015 Sharma ................. G06F 3/0304
9,536,132 B2 * 1/2017 Holland ............. H04N 5/23219
(Continued)

OTHER PUBLICATIONS

Konstantinos Votis, A visual impaired simulator to achieve embedded accessibility designs, 2009, pp. 1-5. https://ieeexplore.ieee.org/document/5358165 (Year: 2009).*

(Continued)

*Primary Examiner* — Mongbao Nguyen
(74) *Attorney, Agent, or Firm* — Venable LLP; Ryan T. Ward

(57) ABSTRACT

Systems, devices, and methods for software development or modification. The disclosed technology relates to transforming interactions with physical blocks by a human developer on an activity surface into computer-understandable digital information or logic for developing or modifying software (e.g., websites or mobile applications) in real-time or near real-time. The physical blocks are representative of software elements used in software development. For example, the structures, colors, shapes or hardness/softness/squeeze/bend/flex/elastic/shape-memory/rigid properties, whether symmetrical or asymmetrical, whether open-shaped or close-shaped of the physical blocks can determine which software elements are being developed and the arrangement of the blocks can be mapped to how the software elements are to be included in the software. Users located remotely from the developer can provide annotations or feedback to the software being developed in real-time.

16 Claims, 13 Drawing Sheets

(51) Int. Cl.
*G06F 3/16* (2006.01)
*G06F 8/20* (2018.01)

(56) References Cited

U.S. PATENT DOCUMENTS

| | | | | |
|---|---|---|---|---|
| 2012/0249741 | A1* | 10/2012 | Maciocci | G06T 15/503 |
| | | | | 348/46 |
| 2012/0327258 | A1* | 12/2012 | Holland | G06K 9/00228 |
| | | | | 348/222.1 |
| 2014/0359559 | A1* | 12/2014 | Qi | G06F 8/34 |
| | | | | 717/105 |
| 2018/0349108 | A1* | 12/2018 | Brebner | H04W 4/80 |
| 2019/0332361 | A1* | 10/2019 | Batra | G06F 8/36 |
| 2020/0160748 | A1* | 5/2020 | Hans | G01C 21/3608 |
| 2020/0233924 | A1* | 7/2020 | George | G06F 40/197 |
| 2020/0241851 | A1* | 7/2020 | Yajima | G06F 8/34 |
| 2020/0293177 | A1* | 9/2020 | Iglesias | G06F 3/011 |
| 2021/0026623 | A1* | 1/2021 | Me | G06F 3/167 |
| 2021/0034319 | A1* | 2/2021 | Wang | G06F 3/1454 |

OTHER PUBLICATIONS

Khaled Albusays, Eliciting Programming Challenges Faced by Developers with Visual Impairments: Exploratory Study, 2016, pp. 82-85. https://ieeexplore.ieee.org/stamp/stamp.jsp?tp=&arnumber=7809491 (Year: 2016).*

* cited by examiner

SYSTEMS, DEVICES, AND METHODS OF DEVELOPING OR MODIFYING SOFTWARE USING PHYSICAL BLOCKS

CROSS-REFERENCE TO RELATED PATENT APPLICATIONS

This patent application claims a benefit of priority to U.S. Provisional Patent Application 62/811,445, filed on 27 Feb. 2019, which is herein incorporated by reference for all purposes.

TECHNICAL FIELD

Generally, this disclosure relates to software development or modification. More particularly, this disclosure relates to transforming interactions with physical blocks on various activity surfaces into computer-understandable digital information or logic for developing or modifying software (e.g., firmware, operating systems, applications, extensions, websites, image editing, video editing, mobile apps) in real-time or near real-time.

BACKGROUND

Conventionally, new software is developed in one of two possible ways. In the first way, an entity that needs to develop the software outsources the task of developing the software to another entity. According to the second way, the entity develops the software itself, as a do it yourself (DIY) project.

The first way of developing software enables an outsourcer, without advanced computer programming skills, to deploy websites, mobile applications, and develop software solutions for their business or for their personal use. However, outsourced software development can be time-consuming and expensive. When software development is outsourced, then comments and feedbacks between the outsourcer and the outsourcee (i.e., the entity to which development is outsourced) are exchanged over emails, teleconferencing, or phone calls and each revision of the software can incur additional costs.

The second way of developing software, i.e., DIY software development, on the other hand, can provide a technologically-savvy person with the ability to write/develop/code software inexpensively, e.g., using freely available or commercially available tools. Although these tools can save money and time, they typically need knowledge of advanced computer programming skills and in many cases, creative and artistic skills. Consequently, software developed using the DIY tools often lacks the look/appeal and functionality of professionally developed software. Thus, there is a need for improved techniques for software development or modification.

Further, these modalities of software development are made more complex when the developer is visually challenged (e.g., visually impaired, low vision, blind, or legally blind in at least one eye). For example, there is a lack of accessible design tools for such developers since there is no tactile technology at least for design a graphical user interface (GUI) layouts or for design of logic statements.

DETAILED DESCRIPTION

Figure 1:
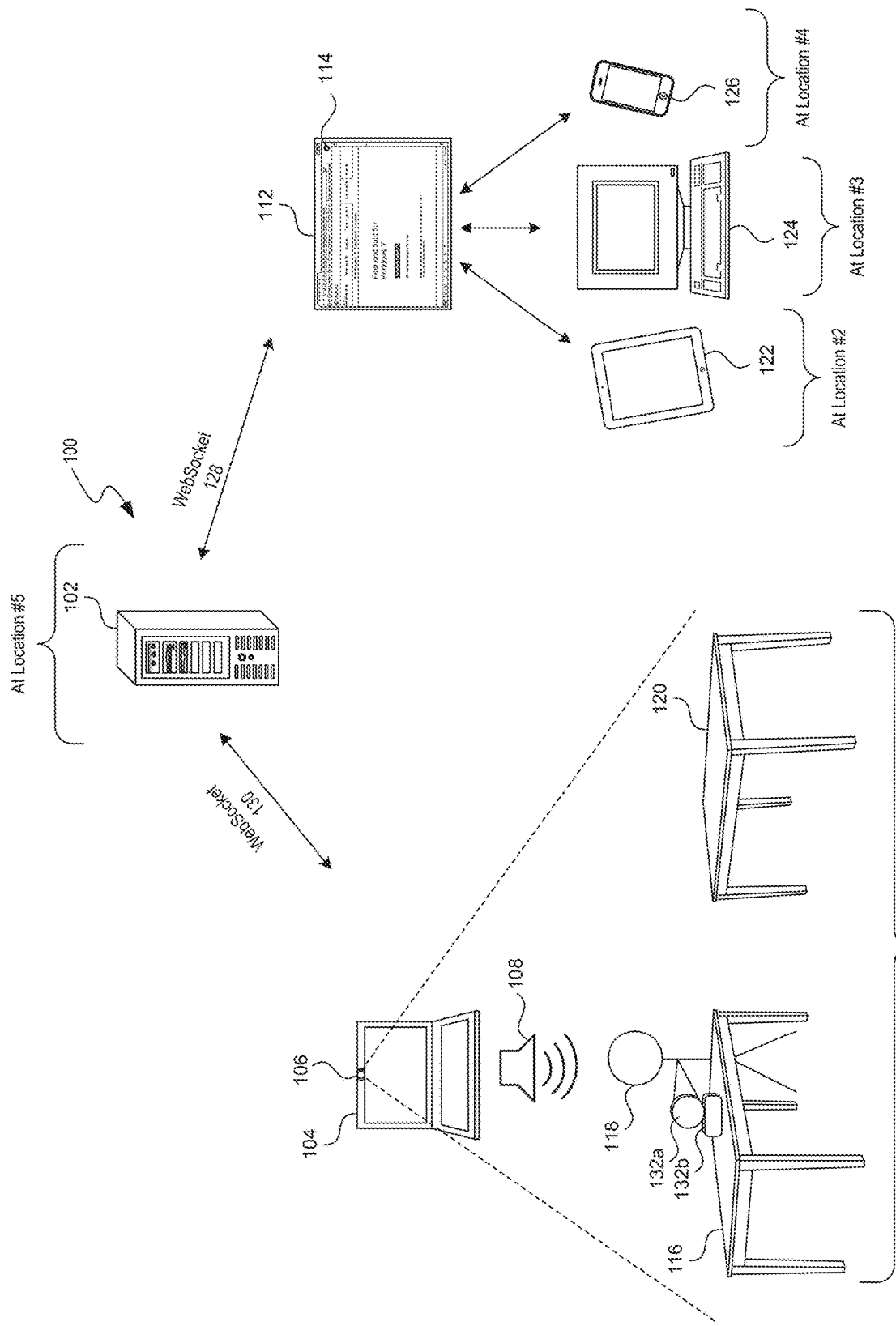
FIG. 1 illustrates an embodiment of an environment where the disclosed software development system is operable.

Embodiments disclosed herein are directed at systems, devices, and methods associated with various technical environments for software development or modification. Unlike traditional software development environments, the disclosed technical environments can include or enable a tactile and audio interface to facilitate or enable software development or modification (e.g. firmware, operating systems, applications, extensions, websites, image editing, video editing) or mobile app development or modification for people who are visually challenged (e.g., visually impaired, low vision, blind, or legally blind in at least one eye). The software development environments includes at least one activity surface on which a developer interacts (e.g. handles, rotates, manipulates) with physical blocks of various shapes, surface textures, colors, sizes, or hardness/softness/squeeze/bend/flex/elastic/shape-memory/rigid properties, whether symmetrical or asymmetrical, whether open-shaped or close-shaped. A periodically-refreshing video camera captures which physical blocks are being used or interacted with and specific details related to their property, orientation, or placement on the at least one activity surface. The physical blocks can have different shapes, forms, colors, or structures. They can also have Braille markings, numbers, QR codes, or other types of engravings/markings that uniquely identify a physical block. For example, physical blocks can differ in shape, size, form, color, structure, surface texture, tactile indicia, weight, volume, density, or content depicted thereon. A computer connected to the video camera maps the physical blocks and their arrangement/orientation into snippets of computer code, which can be in real-time. One or more physical blocks can be representative of a software element (e.g. Boolean, conditional, object, function, class, API, GUI element). For example, a square physical block can indicate a header of a website. A round physical block can be representative of a slider bar on a mobile app. In some embodiments, a physical block can also be representative of one or more actions that a developer typically takes when interacting with software. For example, a triangular physical block on top of a pyramid physical block can be indicative of a delete action. A rhomboid physical block can be representative of a file upload action. In some embodiments, the disclosed technology can control the position or value of transient avatars, such as every time a pieces moves or enters the scene, a new line of code is written, stored, and published (process for construction more so than interaction). In some embodiments, the disclosed technology can avoid reliance on embedded hardware to interpret and write code (the camera interprets visual features to identify code instructions). In this way, the disclosed technology could at least partially or completely replicate the functionality of "imperative" form of programming by using a camera instead of individual sensors, where the camera-equipped computing device would act as the "brain" board, and a designated "start" piece would define the program's starting point. Further, the disclosed technology could go even further and then encode the entirety of this sequence, function, or program in a single block. These blocks themselves could then be composed to arbitrary degrees of complexity as the computing device is able to track and convey arbitrary orders of complexity. Therefore, the disclosed technology can enable the user to engage directly with spatial data and physical data structures (as opposed to or additional to mere instructions). In some embodiments, the disclosed technology allows users to define 2 or 3 dimensional layouts for GUI's and other graphical assets and can be used to tactilely format documents in word processing applications, tables in spreadsheet applications, slides in presentation applications, and other content (e.g. alphanumerics, audio, imagery, video) entry or modification applications.

The software code snippets can be used to develop or modify software such as create a website or develop a mobile app or another form of logic (e.g. firmware, operating systems, applications, extensions, websites, image editing, video editing). For purposes of discussions herein, the term "software element" is broadly applicable to any type of computer-related attribute: user interface elements (e.g. menu bar, slider, address bar, header, footer, tabs, sections, body, HTML tags, buttons, wrappers, classes, containers, automatic refresh/update) or user actions (e.g. upload, delete, create, slide, tap, scroll, read). Any suitable software element associated with software development or modification is contemplated by embodiments disclosed herein. One technical advantage of the present technology is that this technology is applicable to development of any type of software (e.g. firmware, operating systems, applications, extensions, websites, image editing, video editing) and not limited to the creation of websites and mobile apps. Another technical advantage of the disclosed technology is that a person of limited technical skills can develop software easily and interactively without the need to write computer code. Additionally, a developer who is visually challenged (e.g., visually impaired, low vision, blind, or legally blind in at least one eye) can use Braille-engraved (or another tactile system) physical blocks to develop or modify software.

In some embodiments, the computer connected to the video camera can optionally provide audio feedback of the code snippet or generally announce (in real-time or near real-time to the developer) information identifying which software element has been created or modified. Upon hearing the audio feedback that identifies one or more software elements, the developer can re-arrange or re-order the physical blocks, if he or she desires. Note that although software development or modification is described, this process can also be applied and adapted to reverse engineering. Various embodiments, technical advantages, and technical aspects of the disclosed technology will be even further apparent in the following discussions.

Referring now to the technology in more detail, FIG. 1 illustrates an embodiment of an environment of operation the disclosed software development system 100. For example, FIG. 1 shown a system 100 in which developer 118 assembles or rearranges physical blocks 132a and 132b according to a certain arrangement or pattern to develop or modify software. System 100 includes a central server 102 communicating (e.g., via web sockets 128) with client devices 122, 124, 126 and (e.g., via web sockets 130) computing device 104. In the example shown in FIG. 1, central server 102, client devices 122, 124, 126, and computing device 104 are located at different geographical locations, whether in a single locale or multiple locales. Examples of client devices 122, 124, 126 include but are not limited to mobile devices, tablet computers, laptop computers, desktop computers, smart television sets, digital billboards, consumer wearable devices, or otherwise any suitable electronic device equipped to display a browser 112, including volumetrically. Client devices 122, 124, 126 can display (e.g., to users associated with client devices 122, 124, 126) parts of the software as the software is being created or modified by the system 100 in real-time or near real-time. In some embodiments, users associated with client devices 122, 124, 126 can provide feedback of the software being generated or modified, to developer 118 in real-time or near real-time. In some embodiments, users associated with client devices 122, 124, 126 can annotate portions of the software created by developer 118, which can be in real-time or in near real-time.

Computing device 104 includes a built-in or externally coupled (e.g. USB) camera 106 to capture video of developer 118 placing or assembling or rearranging physical blocks 132a, 132b on physical activity surfaces 116, 120. Based on monitoring video from camera 106, the computing device 104 identifies blocks 132a, 132b with which the developer 118 is interacting. For example, based on identifying a round physical block 132a on top of a rectangular physical block 132b captured by video camera 106, computing device 104 can identify that the developer 118 is signifying construction of a header/title portion of a website including a media file (e.g., a YouTube video or an image). Note that the computing device 104 or the camera 106 can track the blocks 132a, 132b via various object tracking algorithms (e.g. bounding box based, edge detection based, color based, shape based, size based, texture based) or via markers (e.g. barcodes, QR codes) hosted on the blocks 132a, 132b (e.g. printed, engraved, embossed, adhered).

In some embodiments, computing device 104 is configured to provide audio feedback 108 to developer 118 via headphones, internal or external speakers, or consumer wearable devices electronically coupled to computing device 104, which can be in real-time or near real-time. For example, as the developer 118 is assembling or rearranging physical blocks 132a, 132b in a certain orientation to create a menu of multiple items associated with a mobile app, the computing device 104 can announce the creation of the menu, which can be upon completion or during the assembly or the rearrangement. In some embodiments, the developer 118 interacts with physical blocks 132a, 132b on physical activity surfaces 116, 120, such as a horizontally extending surface (e.g. a table, a mat, a carpet, a rug, a game board, a rollable or foldable surface) or any suitable physical surface. The physical surface can be horizontal, vertical, or tilted at a certain angle.

User interface experience (UX) paradigms break down the process of creating or modifying a user interface into two distinct modes: a palette mode and a canvas mode. A palette can be a collection of colors, e.g., hues and their shades. A canvas can be a platform on which user interface elements are rendered. Accordingly, in some embodiments the physical activity surfaces 116, 120 conform to two separate physical activity surfaces 116, 120. For example, the physical activity surface 116 can correspond to a palette on which the developer 118 composes or modifies software elements (e.g., menu bar, slider, address bar, header). Physical activity surface 120 can correspond to a canvas for publishing the software using the software elements created on the palette. Thus, palette 116 and canvas 120 are physical activity surfaces upon which a developer 118 assembles or rearranges physical blocks 132a, 132b in some orientation or arrangement. In some embodiments, functionalities of palette 116 and canvas 120 can be integrated into one larger physical activity surface. Video captured by camera 106 when developer 118 performs physical activities on palette 116 or canvas 120 are processed by computing device 104, and communicated (via web sockets 130) to central server 102. Central server 102 can be proximal or remotely located from computing device 104. Note that the camera 106 can monitor both palette 116 and canvas 120 (inclusive of movement or refocusing of the camera 106 to follow the developer between the palette 116 and canvas 120) or there can be a dedicated camera 106 for each of palette 116 and canvas 120 and in communication with server 102.

Information exchanged (e.g., sent and received) using web socket 128 is configured to be displayed via web browser 112 on client devices 122, 124, 126. Thus, in some embodiments, the disclosed software development system functions as a collaboration tool in which users associated with client devices 122, 124, 126 can view the software as the software is developed or modified by developer 118. In some embodiments, users associated with client devices 122, 124, 126 can annotate/highlight or modify or delete one or more software elements of the software using client devices 122, 124, 126. Information associated with the annotated software elements (or other functions noted above) can be conveyed first from client devices 122, 124, 126 to central server 102 and then conveyed to computing device 104, which can be in real-time or in near real-time. For example, computing device 104 can audibly announce information pertaining to the annotations via audio feedback 108. Thus, one technical advantage of the disclosed software development systems is the full duplex mode of communication between computing device 104 and any of client devices 122, 124, 126, which can be in real-time or near real-time. For example, the upstream communication (from computing device 104) can include a visual demonstration of the software to client devices 122, 124, 126, as the software is designed or modified by developer 118. The upstream communication can include annotations/feedback (or other functions noted above) from client devices 122, 124, 126 back to computing device 104 that can be audibly played or announced to developer 118. Note that content conflict resolution system (e.g. time-based) or versioning systems (e.g. new versions when modifications are entered) can supplement the disclosed software systems.

To enable instantaneity across system 100 (e.g. for interactions on physical surfaces 116, 120 to instantly propagate to web browser 112 without need for web browser 112 to reload), communications with central server 102 utilizes the WebSocket protocol, which maintains a "full-duplex" communication channel between client devices 122, 124, 126 and central server 102. This approach to networking also allows system 100 to be distributed with client devices 122, 124, 126 in different geographic or network locations and yet achieve minimal latency. As a result, a user associated with a client device can instantly observe updates made by developer 118 on physical activity surface(s) 116, 120 with little or minimal delay. Thus, web sockets 128 and 130 provide a persistent, low latency connection that can support transactions initiated by client devices 122, 124, 126, or computing device 104 or central server 102. Client devices 122, 124, 126 establish web socket 128 through a process known as the web socket handshake. This process starts with client devices 122, 124, 126 sending a regular HTTP or HTTPS request to central server 102. A similar process is carried out to establish web socket 130 between central server 102 and computing device 104.

In some embodiments, central server 102 creates a data structure (e.g. array, database, database record, stack, queue, tree, linked list) associated with the software developed by developer 118. This data structure can be an all-encompassing data structure maintained by central server 102 representing the state of the software, including links to supplemental software development assets, such as media files, auxiliary code, links between physical blocks and the software development assets, states of the palette and the canvas, persistent user data, and other operating information. In some embodiments, the data structure is implemented in JavaScript Object Notation (JSON) format.

Client devices 122, 124, 126 and computing device 104 are configured to exchange (e.g., send and receive) "actions" (e.g., state-changing commands) with central server 102 via software extension 114 implemented in web browser 112 (e.g. Firefox, Silk, Chrome, Edge, IE). For example, a user associated with a client device can click on an element of the software being created or modified by developer 118, or drag a box over multiple software elements to send an action to central server 102 via software extension 114. Software extension 114 can be implemented as a mobile application program in alternate embodiments. In some embodiments, software extension 114 and central server 102 can be developed/built using "flux architecture" According to the flux architecture, actions originating from software extension 114 are queued onto a central "reducer" module (e.g. a routine that maps text-based representations of state-changing operations to code) at central server 102. Every action produces a new state tree. Older versions of the tree are stored (e.g., at a database coupled to central server 102) to maintain a history of operations on the tree. A change in the state of the software is associated with a corresponding change in the data structure. As a result, central server 102 issues a message (e.g. with information or identifier or reference or pointer or key or primary key about the updated state of the software) to every connected client. One technical advantage of the present technology is that software extension 114 is not involved in or minimize or reduce interactions between/among other aspects of software development, regardless of how complicated the interactions can be. As one example, the flux architecture is based on the REDUX library. Embodiments of the disclosed technology do not impose any or minimize or reduce limitations on the number of client devices connected to central server 102 that can send/receive actions. Client devices 122, 124, 126 synchronize their state tree with the server's state tree via a persistent web Socket 128. Thus, with any change in the state tree of central server 102, client devices 122, 124, 126 receive this change and apply this change to their state tree by issuing a parallel action to their reducer. This automatic cascade enables the distributed system to operate in real-time or near real-time. In some embodiments, functionalities of computing device 104 are similar to those of any of client devices 122, 124, 126.

Figure 2:
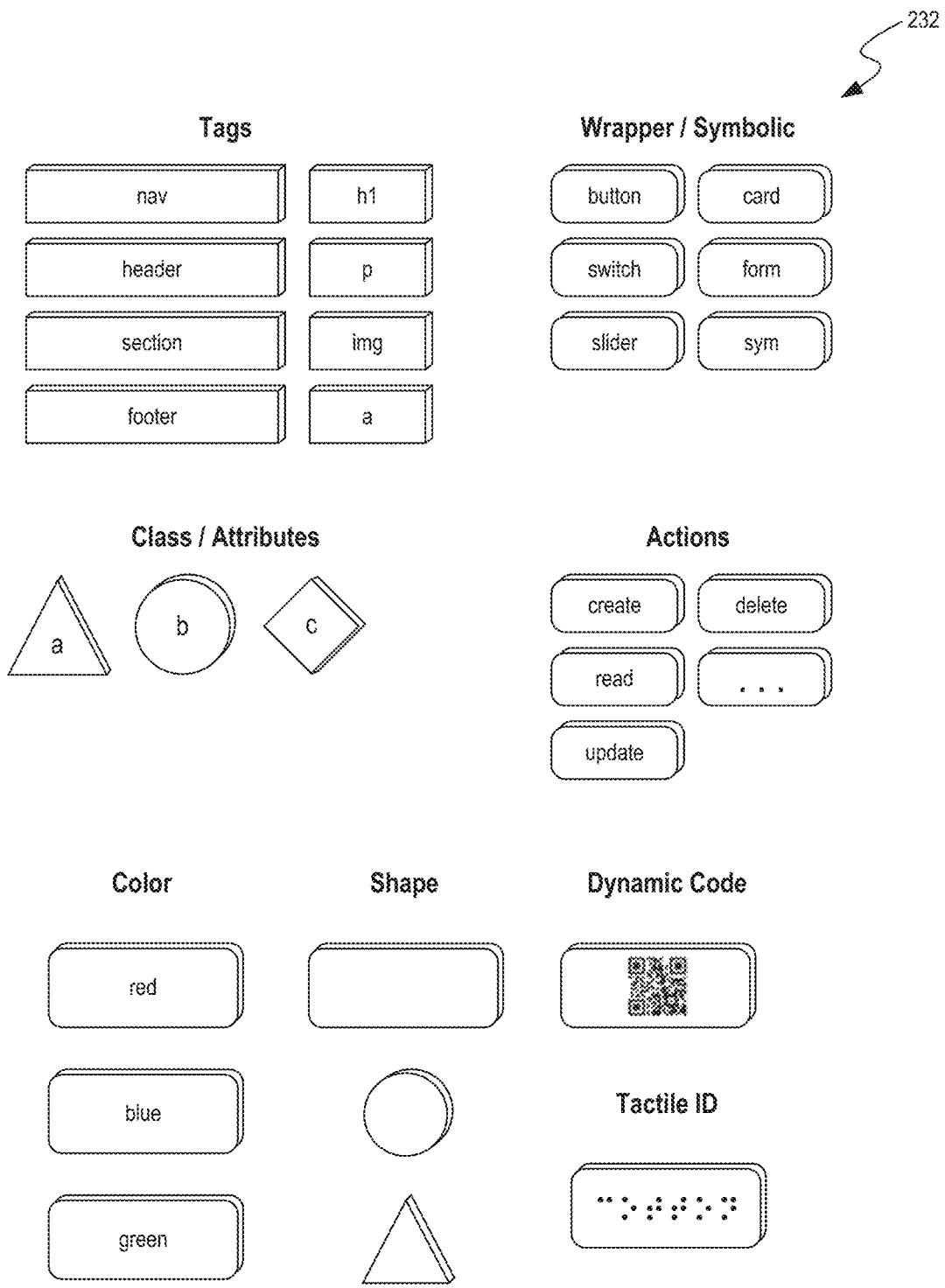
FIG. 2 illustrates an embodiment of assorted examples of physical blocks that can be mapped to software elements.

FIG. 2 illustrates assorted examples of physical blocks 232 (similar to physical blocks 132*a*, 132*b* in FIG. 1) that can be mapped to snippets of software code. The snippets of software code can be used to create one or more software elements (e.g., user interface elements, attributes, classes, tags, buttons, wrappers, classes, containers, or user actions such as read, delete, Boolean, conditional, object, function, class, API, GUI element) associated with a mobile app or a website (or another software form as described above). FIG. 2 shows that physical blocks can have different textures, colors, shapes, sizes, hardness/softness/squeeze/bend/flex/elastic/shape-memory/rigid properties, whether symmetrical or asymmetrical, whether open-shaped or close-shaped, representative of different software elements. In some embodiments, a physical block can include any combination of Braille markings, QR codes, bar codes, or generally any visual or tactile markings or indicia. When a physical block is placed on a palette by a user, the computing device applies computer vision (e.g. object detection, edge detection, OCR, barcode reading) or computer recognition methodologies to the captured video/image(s) to identify the physical block. Upon identifying the physical block, the computing device can send information identifying the physical block to the central server (or the central server can perform the identification). The information can be in the form of unique identifiers which the server can use to map a physical piece to a snippet of computer code. (For example, the central server can store a look up table of mappings between identifiers of physical pieces to snippets of computer code.) In some embodiments, the central server conveys the snippet of computer code to the computing device, which then reads out (e.g., as audio feedback) the snippet of computer code. Although some physical blocks can directly correspond to software elements (e.g., headers, navigation bars, section containers, buttons, switches, sliders, dials etc.), any combination of physical blocks can be mapped to a snippet of software code. Examples of software code snippet include but are not limited to HTML modules, CSS functions, JavaScript objects, routines, Boolean, conditionals, functions, objects, API, and modules imported from external, third-party software libraries, such as wrappers for mobile application development or virtual reality development.

Figure 3:
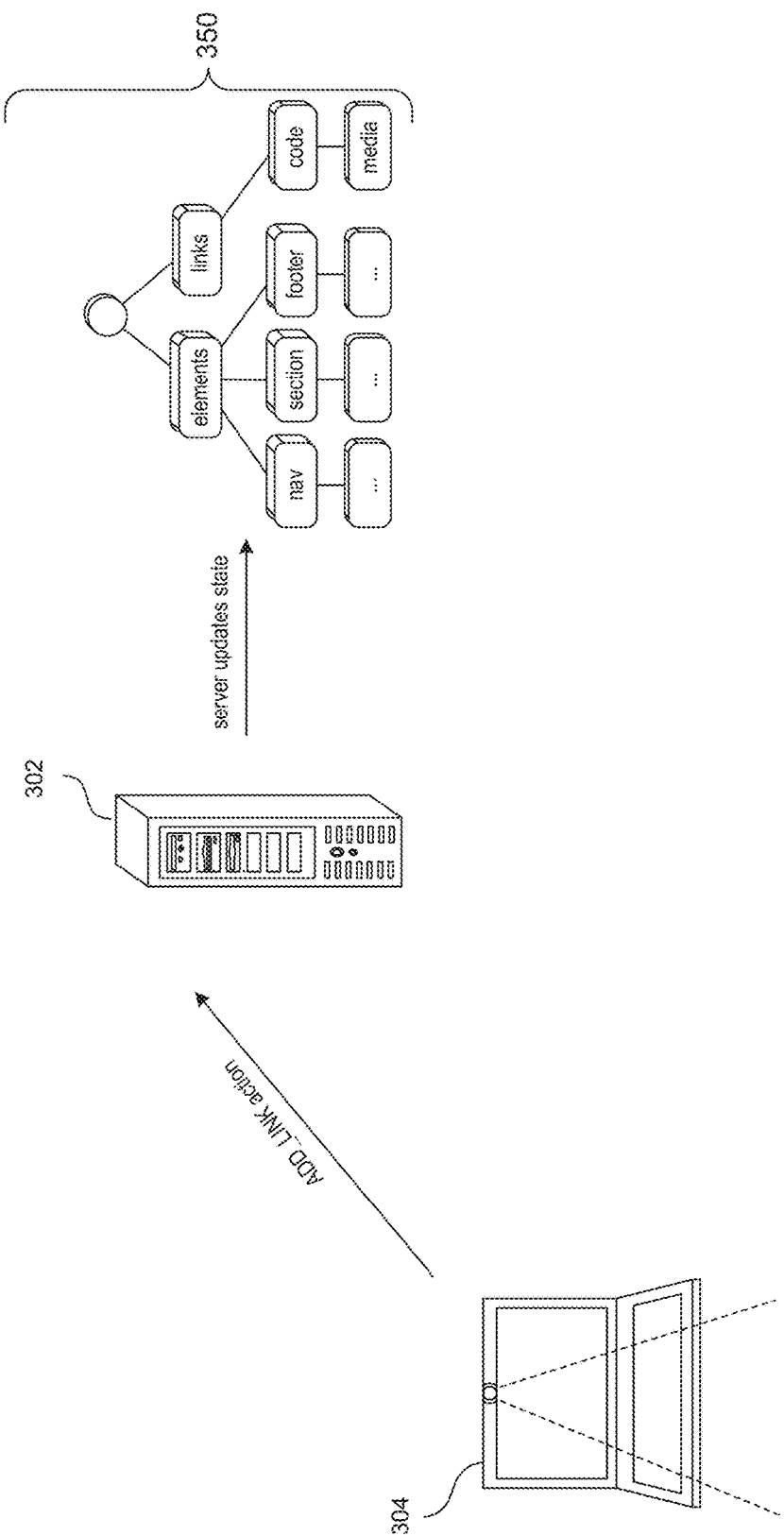
FIG. 3 is a block diagram representative of an embodiment of a state tree illustrating links between media files and physical blocks.

FIG. 3 is a block diagram representative of a state tree illustrating links between media files and physical blocks. For example, FIG. 3 shows a scenario where a developer intends to create or modify a software element for linking a developer-provided media file to a physical block. When a developer intends to include a media file or file including media (such as an image or a video) into the software that he or she is developing, the developer first places a physical block corresponding to a developer-provided linked media. In response to a developer placing a block, computing device 304 identifies such a block and sends a message including an ADD_LINK action to central server 302. Upon receiving the message with the ADD_LINK action, the server updates a state tree with a link to the developer-provided media file. The media file can be uploaded directly to the central server 302, via a web application or an automated email-to-upload system or FTP system or Bittorrent system. In some embodiments, computing server 302 can create links to multiple media files uploaded by a developer. State tree 350 is an example state tree maintained by central server 302 associated with the software developed by the developer. One technical advantage of the disclosed technology is that the state tree maintained by the central server can be a constantly-evolving state tree representative of the software developed or modified by the developer and including any changes or updates to it. For example, when one or more blocks are added or rearranged via the palette and/or the canvas, the additions or rearrangements of the physical blocks are translated as updates to the state of the tree maintained by the central server. Because central server 302 can re-map a physical block to software code snippets an arbitrary number of times, this encoding/mapping technique is flexible and dynamic.

Figure 4A:
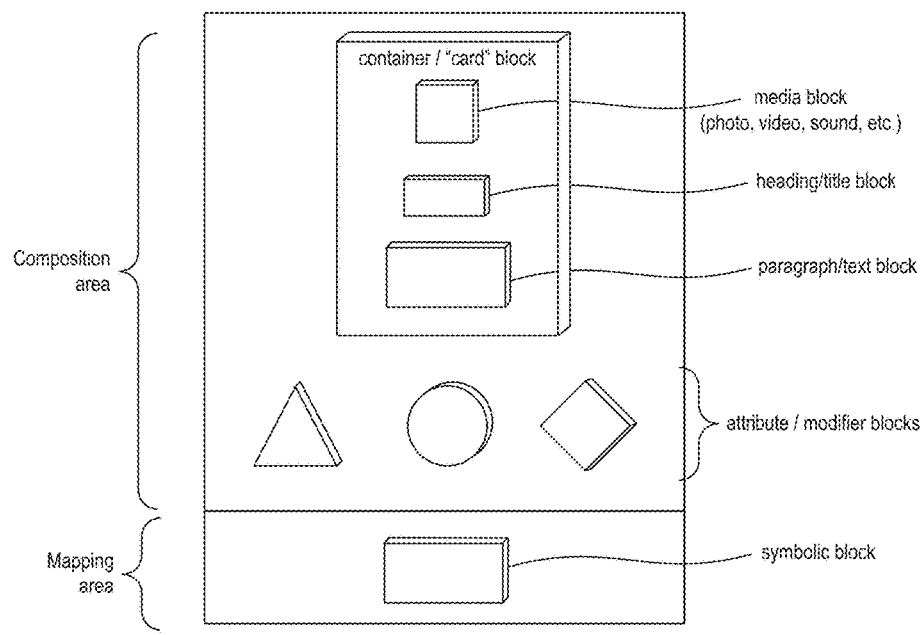
FIGS. 4A and 4B illustrate an embodiment of example mappings between physical blocks and snippets of software code.
Figure 4B:
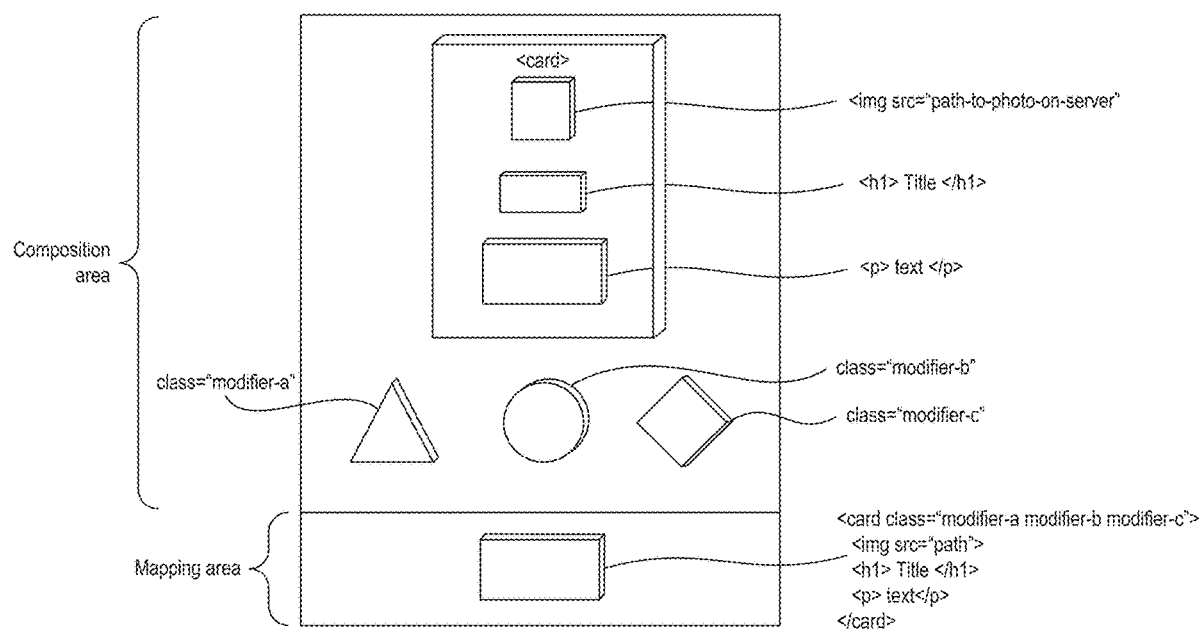

FIGS. 4A and 4B illustrate example mappings between physical blocks and snippets of software code. The physical blocks, for example, are placed on a palette by a developer. The camera coupled (e.g. wired, wireless, waveguide) to the computing device periodically (e.g. several, tens, hundreds, thousands, millions of times per one second) scans the palette capturing video/images. The computing device identifies the physical blocks placed by a developer from the captured video/images. FIG. 4A illustrate multiple physical blocks in connection with creating a card class (i.e., a type of a software element). FIG. 4B shows the software code snippets (e.g., HTML code) associated with the card class. In some embodiments, the HTML associated with the card class can be engraved or embossed or printed or adhered or handwritten or stamped on a physical block. In some embodiments, the computing device and/or the central server maps the physical blocks of the card class to HTML based on entries stored in a look up table. For example, the look up table entries can map various physical blocks to software code snippets.

FIG. 4A shows a container/card physical block that supports on top of it one or more block(s) such as a media block, a heading/title block, and a paragraph/text block. As will be appreciated and understood, embodiments of the present technology allow any type or number of physical blocks to support any number or type of physical blocks. In some embodiments, the palette is divided into a (upper) composition area and a (lower) mapping area, as shown in FIGS. 4A and 4B. In some embodiments, these areas are discernible both tactilely and visually. To track these patterns, the camera coupled to the computing device observes the palette through a video stream or live video.

The composition area allows the developer to combine code snippets by layering physical blocks on top of one another or enable rearrangement. As another example, if a developer wishes to add (or modify) hyperlinks to a navigation bar, he or she may place a "navigation bar" physical block onto the palette's composition section. Once the computing device recognizes the block corresponding to the navigation bar, the developer may place a block corresponding to a hyperlink (mapped to an html "a" tag) on top of the block corresponding to the navigation bar. The computing device can interpret this combination of blocks as a hyperlink within a navigation bar, which the computing device can identify and issue a message to the central server.

In some embodiments, a developer can modulate snippets of computer code by adding "modifier" or "attribute" physical blocks to the composition area in conjunction with some attributable block (e.g., such as a media block, a heading block, and a paragraph block). Attribute blocks can be physical blocks that, for instance, bind html classes to html elements. One example of such modulation is formatting a hyperlink. If a developer wishes to add or edit a hyperlink's font size, font color, padding, or any other feature, he or she may add or edit a physical block corresponding to any of these settings to the palette area. After the computing device detects a hyperlink block and an attribute block concurrently within the composition area, the computing device applies the attribute block's data to the hyperlink, which, in HTML, can correspond to adding or modifying a "class" provided by the attribute block to the HTML element encoded by the hyperlink block.

In some embodiments (e.g. FIG. 4A), one or more blocks placed in the composition area can be mapped into a symbolic block placed in the mapping area. This method of mapping one or more blocks placed in the composition area (of the palette) to a symbolic block placed in the mapping area (of the palette) helps in a modular development or modification of software. Multiple attributes (e.g. padding, font-type/size, background color, etc.) placed on the composition can be bundled into a reusable, multifaceted "symbolic" attribute physical block. Subsequently, the single symbolic block can be placed on the canvas to create or modify one or more software elements, as if it were multiple physical blocks.

In some embodiments, to further adjust attributes, developers can use interactive physical blocks (also called variable attribute physical blocks) such as dials and sliders to specify an attribute's value. The computing device can use coordinate geometry to identify the values expressed using the dials and sliders. For example, if a developer wishes to specify a value for padding, he or she can place a padding attribute block on the composition area in conjunction with a slider adjusted to the correct value (e.g., chosen from a relative range of values, where a pre-determined range is mapped onto the slider).

Figure 5A:
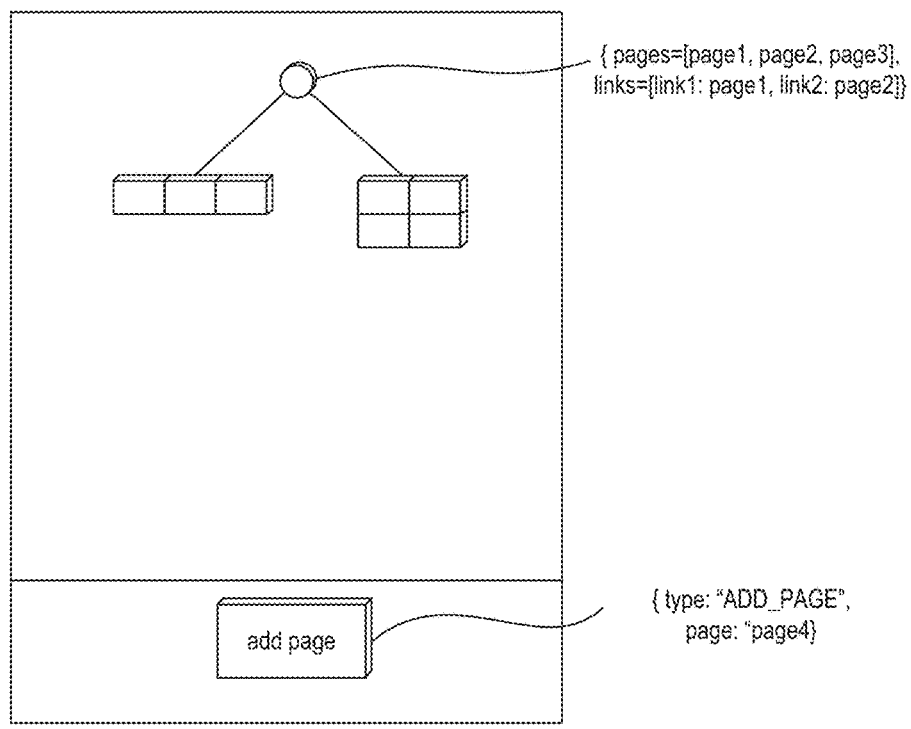
FIGS. 5A and 5B illustrate an embodiment of an arrangement of physical blocks on a palette in connection with adding a new webpage to a website development software.
Figure 5B:
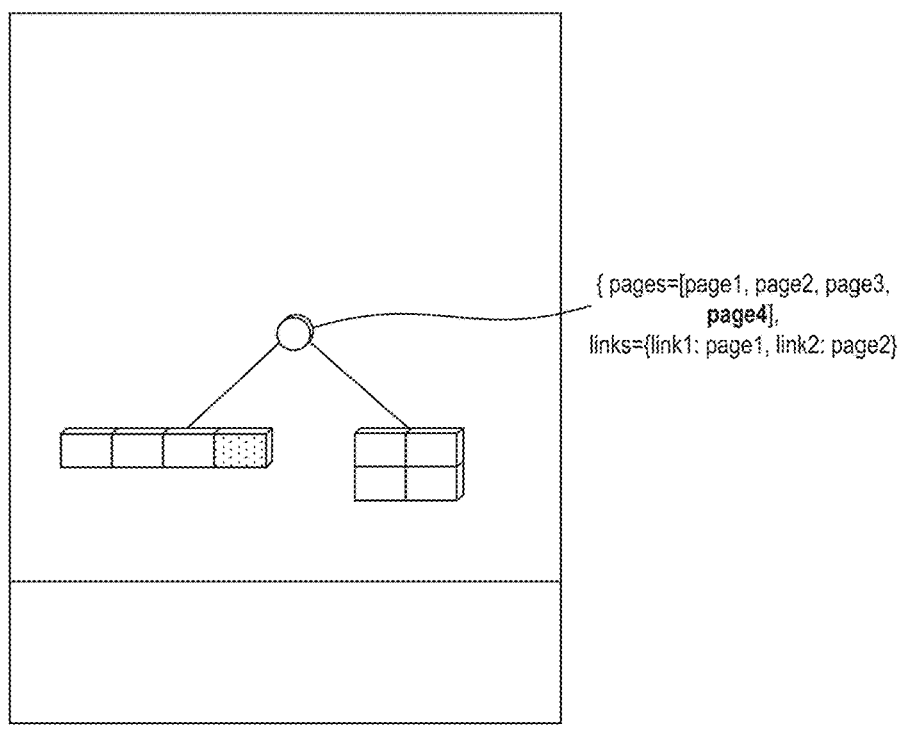

FIGS. 5A and 5B illustrate an example arrangement of physical blocks on a palette in connection with adding a new webpage to a website development software. FIG. 5A shows a first set of pages blocks connected to a second set of links blocks via a common node block before a page is added. FIG. 5B shows the first set of pages blocks connected to the second set of links blocks via the common node block after the page is added. The pages blocks correspond to a page 1, page 2, and page 3. The links blocks are denoted as link 1 and link 2, Page 1 and page 2 are linked by link 1 and link 2. The links blocks and the pages blocks are located on the mapping area of the palette. Upon adding an add page block in the composition area of the palette, a new page (page 4) is added to a website. The software code snippet corresponding to the add page block is type: "ADD_PAGE," page: "page 4." In some embodiments, the disclosed technology can interpret physical data structures. By placing the starting and ending state of a data structure (the system can recognize representations of any data structure) on the activity space, the system can recognize an operation on the data structure, map this operation to an arbitrary physical piece, and then attach this functionality to interactive elements such as buttons. Moreover, using spatial audio (e.g. acoustic VR) a collaborator's annotation or highlight of an element from the published application can be related to the developer's tactile-acoustic environment. Further, the disclosed technology has an ability to support multiple collaborators at one time improves on imperative programming model. In such a scenario, different users could, for instance, each be working on different web pages (or other tasks described herein) on separate devices. The central server could then unify these contributions.

Figure 6A:
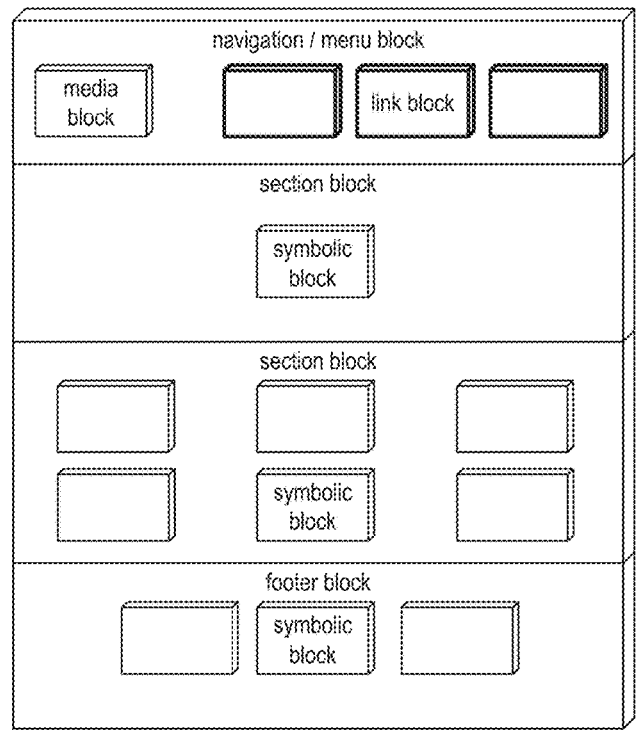
FIGS. 6A and 6B illustrate an embodiment of example mappings between snippets of software code and software elements.
Figure 6B:
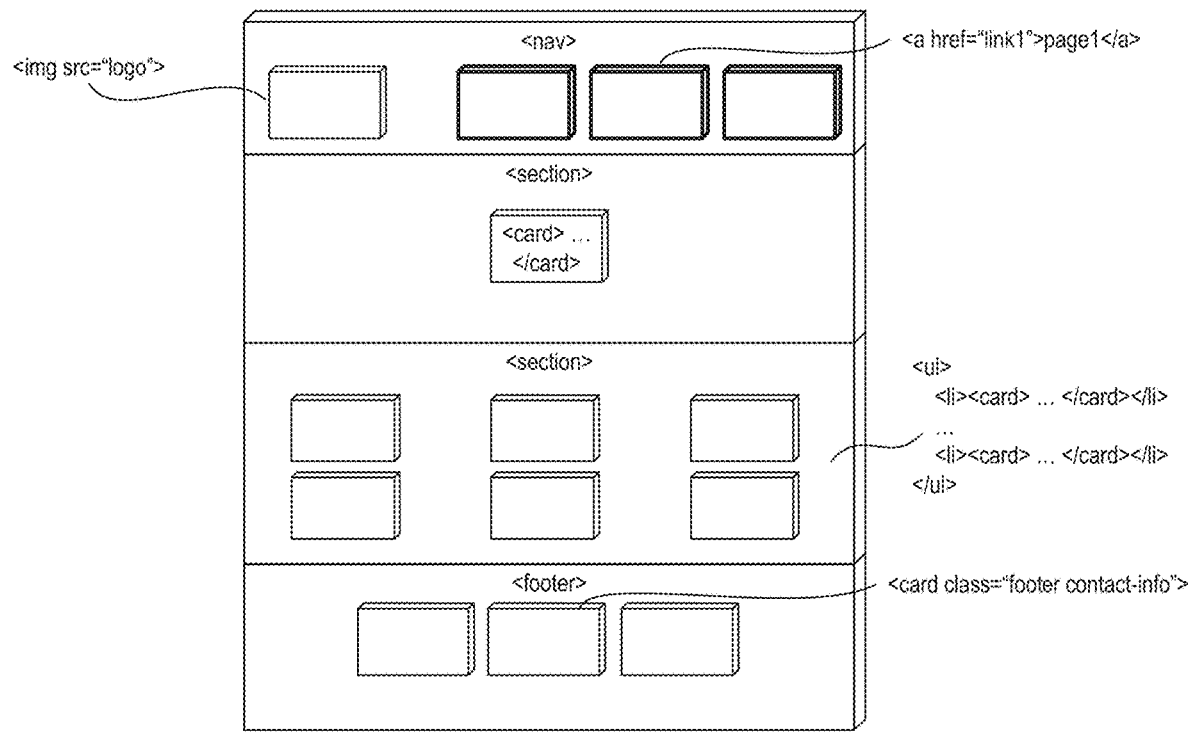

FIGS. 6A and 6B illustrate example mappings between snippets of software code and software elements. Similar to the palette, a canvas is used as part of the present technology to map the geometry/arrangement of the physical blocks into software elements. For example, the physical blocks can be used to model software elements such as "actions" that are to be undertaken by the central server. The actions can make network requests initiated by the server, mutate the state tree maintained by the central server, or execute arbitrary computer code. To define a server-changing action, the developer can place two "state trees" corresponding to any mutable branch of the server's state tree under the palette and/or the canvas. For example, a left tree can reflect an initial state—a state before the action is applied. A right tree can reflect a final state—reflecting how the state tree "should look" after the action is applied. The computing device can identify both trees and interpret their differences to determines which action(s) the developer intends to express. The action is then taken by the central server. In some embodiments, the developer can map an action to a symbolic physical block as described above. The symbolic physical block can be used to create or modify other interface elements, such as buttons and ribbons or others. Through repeated compositions that use the symbolic block, a developer can construct or modify various interactive software elements, such as forms and search bars or others.

The geometry/arrangement of the physical blocks on the canvas and/or the palette can be mapped to software elements, e.g., into a document object model (DOM) or another graphical user interface scheme. Specifically, once a developer places a physical block on the canvas, the computing device (in conjunction with the coupled camera) reads or detects its encoded value/mapping and uses a coordinate system to order the snippets of software code, for instance, in the DOM. The computing device then sends a message to the central server, which causes the piece to instantly or near instantly appear on all client devices connected to the central server. The client devices, for example, can be user devices capable of displaying web browsers and connected to the central server via web sockets. Thus, in some embodiments, the geometry of the physical blocks (or another block property or characteristic) arranged on the canvas in accordance with an order can be used to dynamically publish software as the software is being developed or modified in real-time or near real-time. FIGS. 6A and 6B illustrate publication of a software element, e.g., a "card class" (included as part of a software) based on an example arrangement of physical blocks. FIG. 6A shows the various physical blocks on the canvas and FIG. 6B shows snippets of software code included as part of the card class. For example, FIG. 6B shows various sections of the card class.

Figure 7:
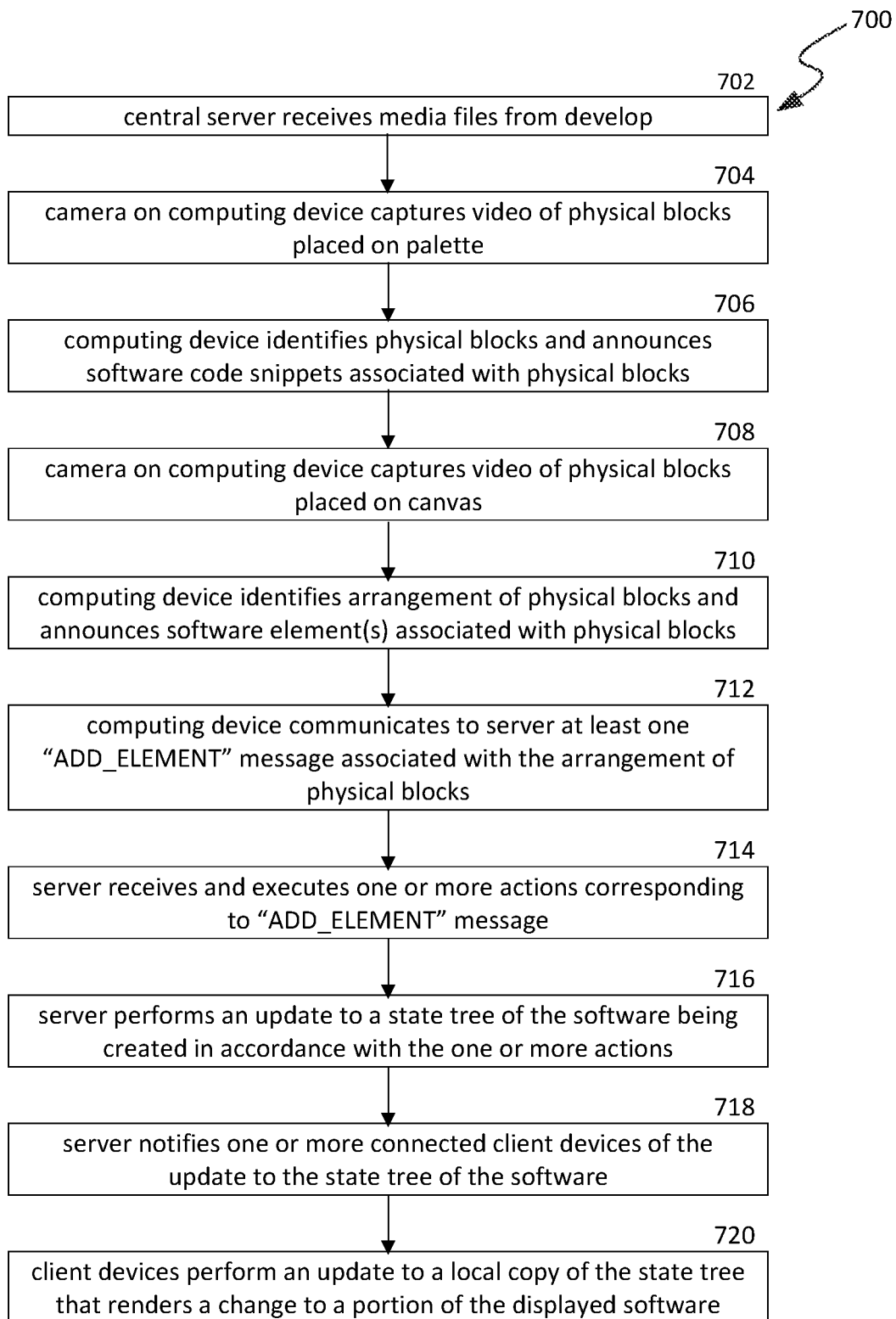
FIG. 7 is a flowchart showing an embodiment of a method inclusive of steps associated with developing software using physical blocks.

FIG. 7 is a flowchart showing steps associated with developing software using physical blocks. At step 702, the central server receives (e.g., a developer upload via a web application or an automated email-to-upload system) media files or file containing media from a developer. In embodiments where media files are not necessary, this step can be omitted. At step 704, the camera coupled to the computing device captures video of physical blocks placed on the palette. The physical blocks can indicate one or more primary software elements that can be used to create or modify software. The computing device identifies (step 706) the physical blocks placed on the palette and announced which physical blocks are being placed. For example, these physical blocks are going to be used to create or modify the software being developed by the developer. In some embodiments, the computing device can announce software code snippets associated with the physical blocks. The computing device sends (to the central server) information identifying which physical blocks are being used. Upon receiving (at step 702) the media files or the file containing media and the information identifying the physical blocks, the central server creates a link between each media file and a snippet of software code based on the information identifying a physical block. The central server generates a state tree (or another state data structure) associated with the various software elements intended to be used by the developer in developing the software. The software elements, for example, can be represented as data structures in the software code snippets.

At step 708, the camera coupled to the computing device captures video of physical blocks placed on the canvas (or lifted or handled relative to the canvas). The computing device identifies (step 710) the geometry (e.g., 1-, 2-, or 3-dimensional arrangement) of the physical blocks on the canvas. The geometry defines how the software elements are to be used in creating the software. At step 712, the computing device communicates at least one ADD_ELEMENT message describing the arrangement of the physical blocks placed on the canvas. Thus, different arrangements can cause different ADD_ELEMENT messages to be sent. At step 714, the central server executes an action in accordance with the ADD_ELEMENT message. At step 716, the central server performs an update to the state tree of the software being developed or modified. The update to the state tree reflects components or elements of the software being developed. At step 718, the central server notifies one or more connected client devices of the update to the state tree. The client devices connected to the server display one or more portions of the software developed or modified. At step 720, the client devices perform an update (to their locally-stored state tree) to resemble or mirror the central server's update of the state tree. As a result of the update, a portion of the software displayed on the client device changes. When the central server executes the action corresponding to the ADD_ELEMENT message, the central server translates the snippets of software code (based on information identifying which physical blocks are being used) into software elements (e.g., snippets of HTML), which can be rendered to client devices connected to the central server. In embodiments where there are no connected client devices, steps 718 and 720 can be omitted. The central server can also notify the computing device of the update to the state tree. As will be understood and appreciated, the disclosed technology utilizes at least two electronic devices (e.g., the computing device in an environment where the developer is developing the software and the central server). In embodiments where client computers (e.g., for providing on one or more aspects of the software being developed) are connected to the central server, additional electronic devices can be involved in the software development.

Figure 8:
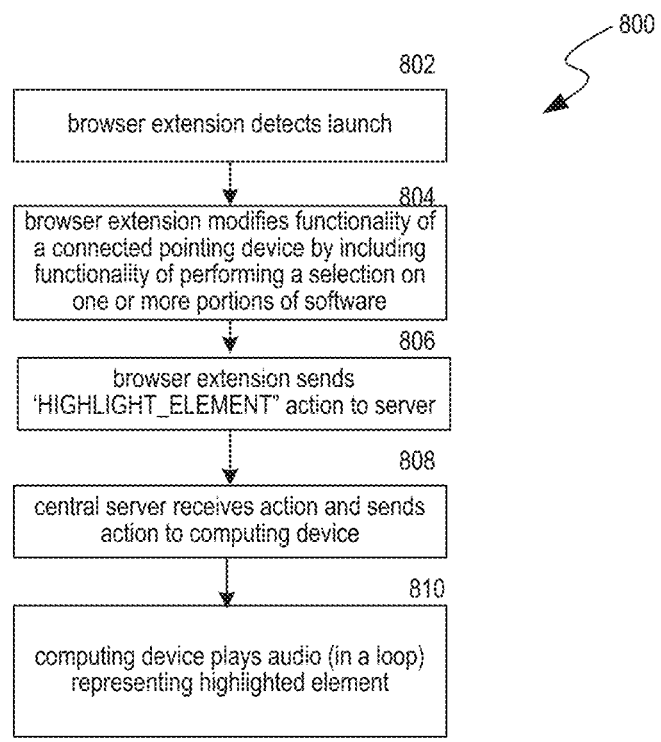
FIG. 8 is a flowchart showing an embodiment of a method inclusive of steps associated with annotating software that is developed using physical blocks.

FIG. 8 is a flowchart showing steps associated with annotating software, or more generally providing feedback in connection with the software being developed or modified using physical blocks by a remote developer. At step 802, a browser extension (e.g., configured to run on a client device) detects that the browser extension has been launched (e.g., by a user who intends to view the software and/or provide feedback to the developer). At step 804, the browser extension modifies functionality of a connected pointing device (e.g., a mouse or a joystick) by adding or including functionality to perform selection, or dragging a box around one or more portions of the software developed by the developer. At step 806, the browser extension sends a HIGHLIGHT_ELEMENT action to the central server, in response to a user highlighting an element of the displayed software. At step 808, the central server receives the HIGHLIGHT_ELEMENT action and sends a message corresponding to the HIGHLIGHT_ELEMENT action to the computing device (located in the environment where the developer is creating or modifying the software). Upon receiving a message corresponding to the HIGHLIGHT_ELEMENT action, the computing device plays (at step 810) audio (e.g., in a loop) to notify the developer of the highlighted software element, until the developer acknowledges verbally or tactilely (e.g., by selecting certain physical blocks) that he or she is aware of the highlighted software element. Note that the browser extension can send upstream actions (rendered app→server-→tactile-acoustic interface on computing device) where the use case is a client giving feedback. However, when the extension can be avoided, then one can toggle the rendered app into a "feedback mode" and run the highlighting UI and send the upstream message from there.

In some embodiments, the disclosed technology can be used to construct or modify "soundscapes." Soundscapes can be virtual reality spaces (e.g. OpenGL space or any virtual 3d space) wherein elements make various sounds for the purpose of being discernible to a non-sighted user or a user who is visually challenged (e.g., visually impaired, low vision, blind, or legally blind in at least one eye). Various triggers in this environment can cause at least some sounds to play, such as when a user crosses a boundary. Three-dimensionality in these spaces is technically advantageous for at least some simulation of acoustics or vertical movement elements. A soundscape designer can use the disclosed technology in a similar way or manner as the designer would do to design a 2d layout. The system would then project the 2d layout into the 3d space. For example, constructing 3d spaces in real-time can be accomplished by creating a WebGL space on the browser (or any 3d space on an internet-connected or network-connected client) and then injecting at least some elements into this space using the same mechanics as injecting elements into a browser as disclosed.

In some embodiments, the disclosed technology can employ artificial intelligence or machine learning for computer vision or rely on strategically-placed bar/QR codes at important physical landmarks (e.g. the camera can discern a coordinate for this code and use coordinate geometry to calculate where the code lies relative to other pieces). For example, the artificial intelligence or machine learning algorithm can be programmed to draw or demarcate rich bounds on pieces of arbitrary geometry but this technique may not be strictly necessary in some cases.

Figure 9:
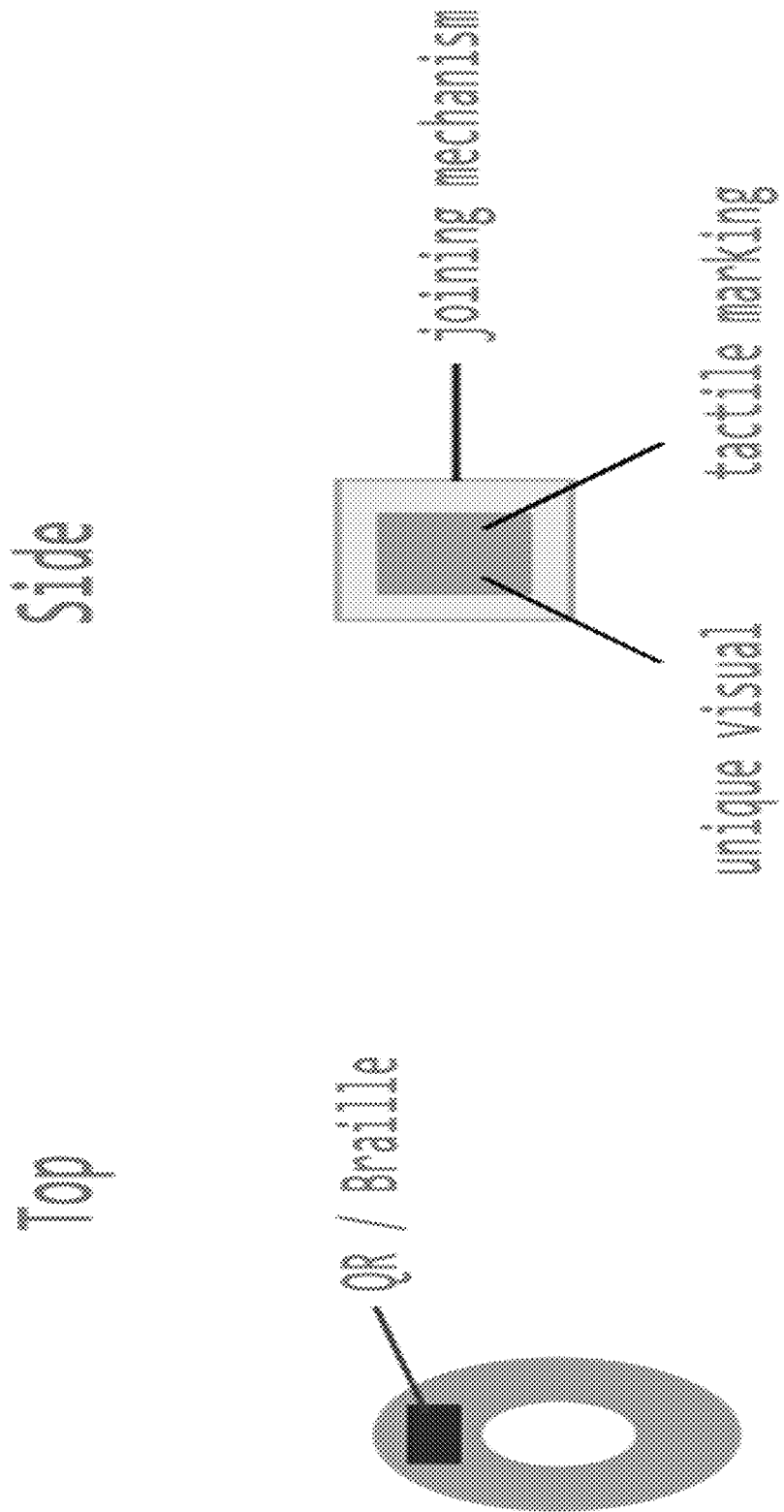
FIG. 9 is a schematic diagram extending FIG. 2 according to this disclosure.

FIG. 9 is a schematic diagram extending FIG. 2 according to this disclosure. In particular, FIG. 9 extends FIG. 2 by depicting a cylindrical piece (e.g., oval cross-section, circular cross-section, triangular cross-section, rectangular cross-section, square cross-section, pentagonal cross-section, symmetrical cross-section, asymmetrical cross-section) with a hole (e.g., oval cross-section, circular cross-section, triangular cross-section, rectangular cross-section, square cross-section, pentagonal cross-section, symmetrical cross-section, asymmetrical cross-section) therein. For brevity and simplicity, this is called a "donut-shaped" pieces. FIG. 9 also shows that visual and tactile codes can be combined into unified tactile graphics. Since these pieces can be vertically stacked on top of one another, as described herein, FIG. 9 also shows an example of where such mechanism can be placed. For example, such mechanism can be magnetic, plastic, metal, shape-memory, rubber, wood, or other suitable materials.

Figure 10:
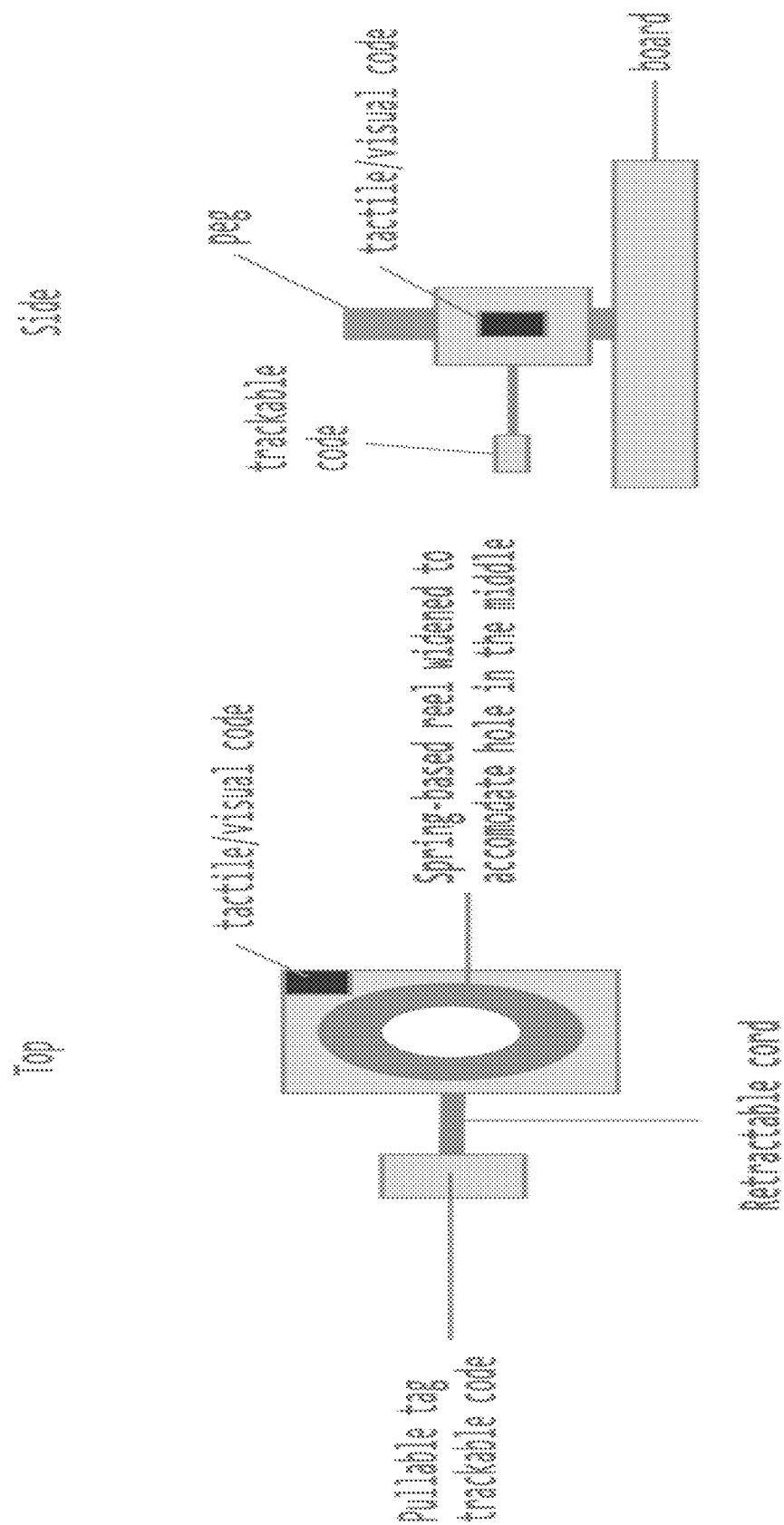
FIG. 10 is a schematic diagram showing a donut-shaped housing a cord according to this disclosure.

FIG. 10 is a schematic diagram showing a donut-shaped housing a cord according to this disclosure. In particular, FIG. 10 depicts how donut-shaped pieces can house retractable cords with trackable tags. This configuration can ultimately use a path drawn by a tag's path to determine a given element's height, width, or other spatial characteristics. Pieces with retractable cords can also be used to define linked data structures (e.g., array, tree), where each of such pieces defines a node or pieces of data and each of such cords attached to another pieces. For example, the cord can act as an "edge" between two pieces, which can be useful for defining directed or undirected mathematical graphs, which readily model data structures. The retracting mechanism can be based on a spring-based coil (or another elastic member), which can be similar to a spring-based coil found within a sewing tape measure.

Figure 11:
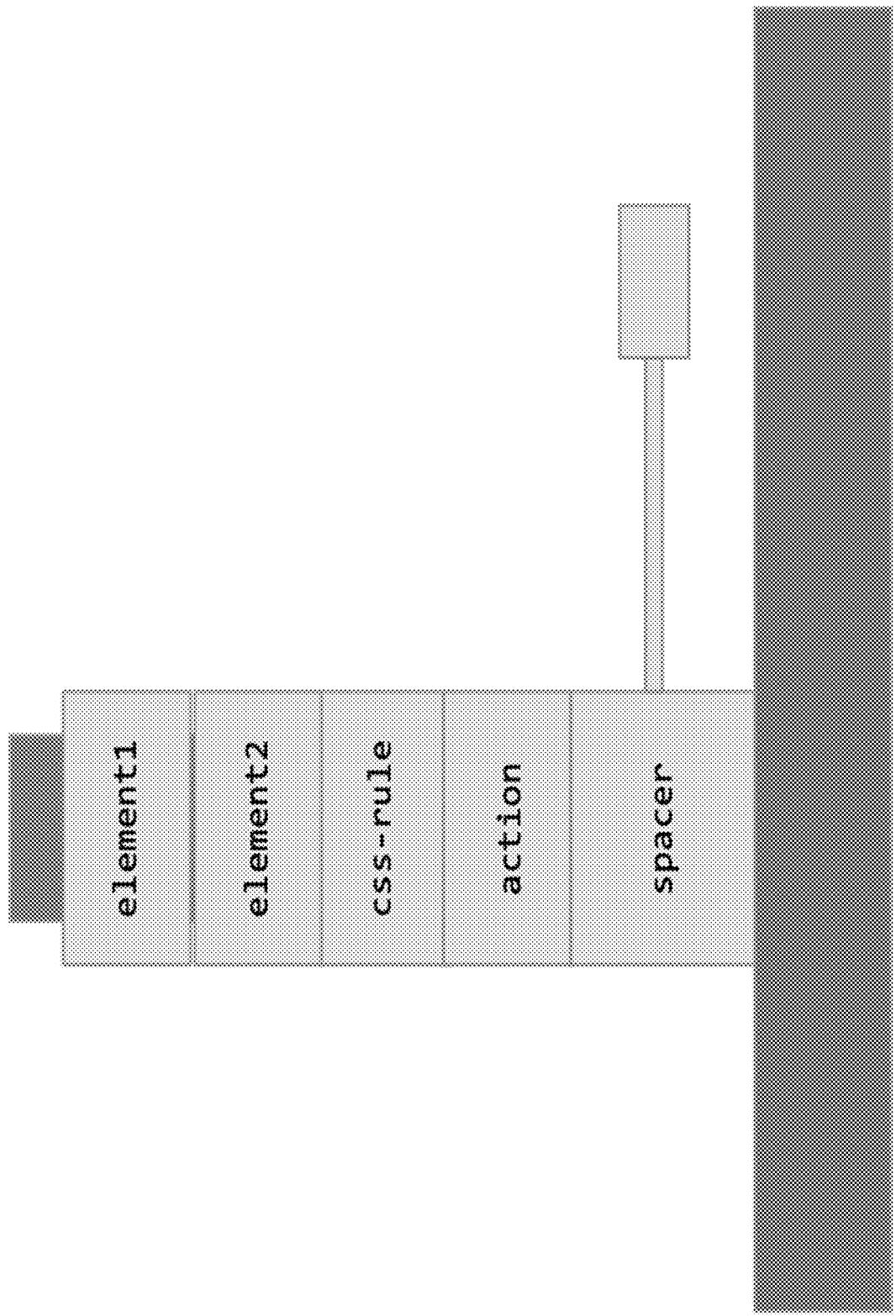
FIG. 11 is a schematic diagram showing how a donut-shaped piece can be vertically stacked according to this disclosure.

FIG. 11 is a schematic diagram showing how a donut-shaped piece can be vertically stacked according to this disclosure. In particular, FIG. 11 shows how various donut-shaped pieces can be vertically stacked on top of a donut-shaped piece containing a retractable cord. When such an arrangement occurs, there can be a computational application of spatial data defined by the path of the cord's tip to some, many, most, or all elements on the stack, often defining their max height and width.

Figure 12:
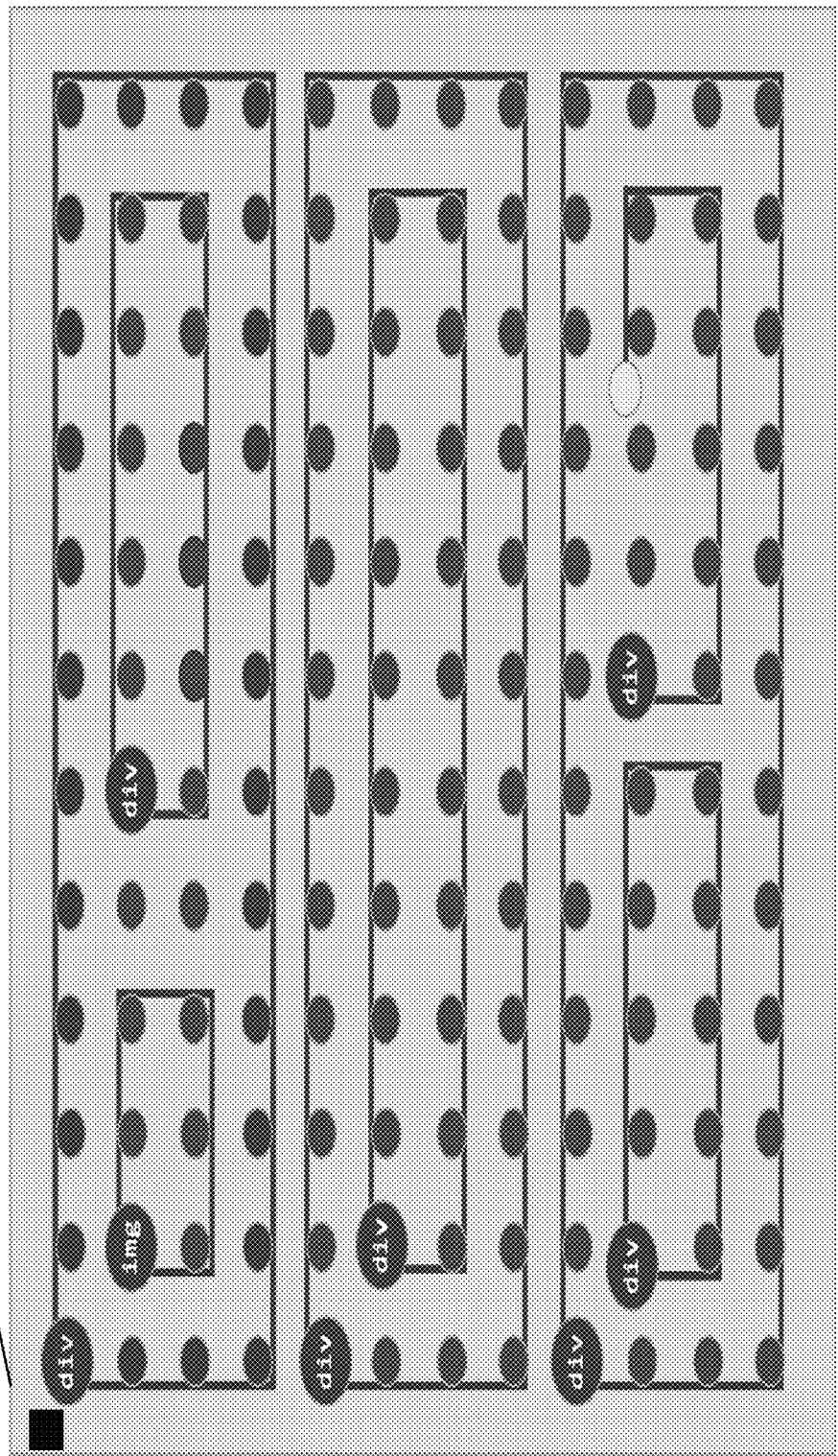
FIG. 12 is a schematic diagram showing a board with a plurality of protruding pegs according to this disclosure.

FIG. 12 is a schematic diagram showing a board with a plurality of protruding pegs according to this disclosure. In particular, FIG. 12 depicts a board with a plurality of protruding pegs, commonly called a "geoboard". This configuration uses a geoboard to help visually challenged users (e.g., blind users) draw straight paths on a grid to define a digital layout, such as a website or user interface, as shown. As shown, a yellow circle depicts a piece's trackable tag and various blue circles show origin of this path, which can be computationally used as an origin to determine (e.g., calculate) a height and width of the path. Note that FIG. 12 supplements FIG. 6A by showing how a visually challenged user (e.g., blind user) can define a spatial layout without having to rely or minimally relying on blocks of predetermined sizes. Further, note that this approach can also be used to define vector graphics or other digital shapes, layouts, graphics, or suitables. Also, at least some code in a top left corner is there to either act as an origin point for tracking and to help a user discern which board is being used as there can be computational utilization of multiple boards.

Figure 13:
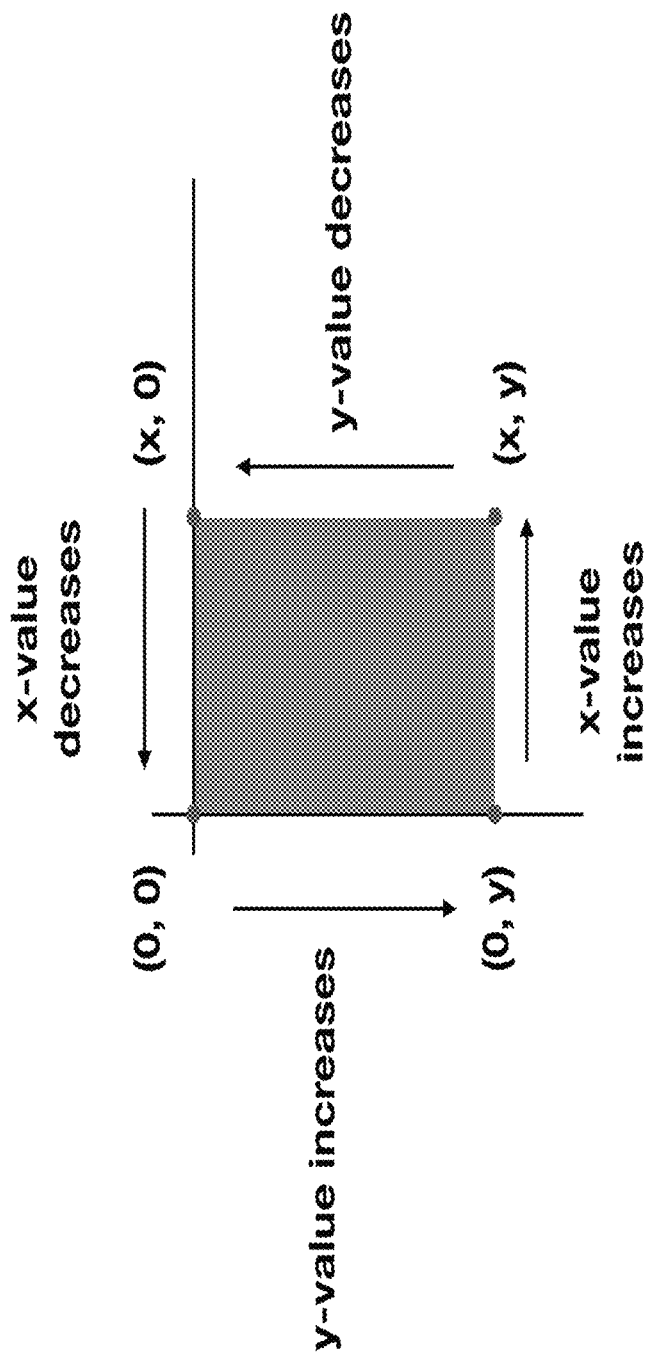
FIG. 13 is a schematic diagram showing a coordinate system according to this disclosure.

FIG. 13 is a schematic diagram showing a coordinate system according to this disclosure. In particular, FIG. 13 illustrates a computational coordinate definition where a processing logic considers a top left of starting point (0,0) and then calculates increasing height as a downward offset in a vertical direction and an increasing width as a rightward offset in a horizontal direction.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present disclosure is not intended to be limited to the embodiments shown or described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for software development or modification, the method comprising;

receiving, from a camera, imaging content, the imaging content capturing a visually challenged user performing an interaction with a plurality of physical blocks over a surface, wherein the physical blocks are different from each other in at least one of shape, size, form, color, structure, surface texture, tactile indicia, weight, volume, density, or content depicted thereon, where at least one physical block within the plurality of physical blocks is stacked on top of a second physical block within the plurality of physical blocks;

identifying, via at least one processor, the interaction of the visually challenged user with the physical blocks over the surface within the imaging content based on the physical blocks being different from each other in the at least one of shape, size, form, color, structure, surface texture, tactile indicia, weight, volume, density, or content depicted thereon;

mapping, via the at least one processor, the interaction of the visually challenged user with the physical blocks to a plurality of computing instructions corresponding to the physical blocks;

formulating, via the at least one processor, a plurality of computing statements based on the plurality of computing instructions without the visually challenged user typing the plurality of computer statements;

causing, via the at least one processor, the plurality of computing statements to be saved;

the method further comprising:

requesting, via the at least one processor, a speaker to output an audio content associated with at least one of the plurality of computing statements responsive to the interaction such that the visually challenged user can rearrange or reorder the physical blocks, wherein the audio content includes an audio identifier of the at least one of the plurality of computing statements, wherein the surface comprises a composition area and mapping area;

a first portion of the plurality of physical blocks is located in the composition area;

the plurality of computing statements are mapped and formulated from the first portion of the plurality of physical blocks;

a second portion of the plurality of physical blocks is located in the mapping area, the second portion being a single physical block; and the plurality of computing statements associated are mapped to the single physical block, such that the single physical block represents at least one of a function or class comprising the plurality of computing statements, and wherein the physical blocks have different shapes, each type of shape of the physical blocks representative of a different software element;

wherein the at least one physical block within the plurality of physical blocks is stacked on top of a second physical block within the plurality of physical blocks has a different shape with the second physical block indicate of a different action.

2. The method of claim 1, wherein the at least one physical block within the plurality of physical blocks is mapped onto at least one of the plurality of computing instructions based on at least one of a property, an orientation, or a placement of the at least one of the physical blocks on the surface.

3. The method of claim 1, wherein the at least one physical block within the plurality of physical blocks hosts at least one of a Braille marking, a number, a barcode, or a QR code such that the at least one of the physical blocks can be uniquely identified in the imaging content.

4. The method of claim 1, wherein the at least one of the plurality of computing statements is of at least one of a video editing logic or an image editing logic.

5. The method of claim 1, wherein the at least one of the plurality of computing statements is of a source code.

6. The method of claim 1, wherein the physical blocks are different from each other via the tactile indicia.

7. The method of claim 1, wherein the at least one processor is of a server.

8. The method of claim 1, wherein the at least one processor is of at least one of a laptop, a desktop, a tablet, or a phone.

9. The method of claim 1, wherein the physical blocks have retractable cords.

10. A system for software development or modification, the system comprising:

at least one processor;

a speaker; and a non-transitory computer-readable storage medium having instructions stored which, when executed by the at least one processor, cause the at least one processor to perform operations comprising:

receiving, from a camera, imaging content, the imaging content capturing a visually challenged user performing an interaction with a plurality of physical blocks over a surface, wherein the physical blocks are different from each other in at least one of shape, size, form, color, structure, surface texture, tactile indicia, weight, volume, density, or content depicted thereon, where at least one physical block within the plurality of physical blocks is stacked on top of a second physical block within the plurality of physical blocks;

identifying the interaction of the visually challenged user with the physical blocks over the surface within the imaging content based on the physical blocks being different from each other in the at least one of shape, size, form, color, structure, surface texture, tactile indicia, weight, volume, density, or content depicted thereon;

mapping the interaction of the visually challenged user with the physical blocks to a plurality of computing instructions corresponding to the physical blocks;

formulating a plurality of computing statements based on the computing instructions without the visually challenged user typing the computer statements;

causing the computing statements to be saved;

the at least one processor to perform operations further comprising:

requesting the speaker to output an audio content associated with at least one of the plurality of computing statements responsive to the interaction such that the visually challenged user can rearrange or reorder the physical blocks, wherein the audio content includes an audio identifier of the at least one of the plurality of computing statements, wherein the surface comprises a composition area and mapping area;

a first portion of the plurality of physical blocks is located in the composition area;

the plurality of computing statements are mapped and formulated from the first portion of the plurality of physical blocks;

a second portion of the plurality of physical blocks is located in the mapping area, the second portion being a single physical block; and the plurality of computing statements associated are mapped to the single physical block, such that the single physical block represents at least one of a function or class comprising the plurality of computing statements, and wherein the physical blocks have different shapes, each type of shape of the physical blocks representative of a different software element;

wherein the at least one physical block within the plurality of physical blocks is stacked on top of a second physical block within the plurality of physical blocks has a different shape with the second physical block indicate of a different action.

11. The system of claim 10, wherein the at least one physical block within the plurality of physical blocks is mapped onto at least one the computing instructions based on at least one of a property, an orientation, or a placement of the at least one of the physical blocks on the surface.

12. The system of claim 10, wherein the at least physical block within the plurality of physical blocks hosts at least one of a Braille marking, a number, a barcode, or a QR code such that the at least one of the physical blocks can be uniquely identified in the imaging content.

13. The system of claim 10, wherein the at least one of the computing statements is of at least one of a video editing logic or an image editing logic.

14. The system of claim 10, wherein the at least one of the computing statements is of a source code.

15. The system of claim 10, wherein the physical blocks are different from each other via the tactile indicia.

16. A non-transitory computer-readable storage medium having instructions stored which, when executed by at least one processor, cause the at least one processor to perform operations comprising:

receiving, from a camera, imaging content, the imaging content capturing a visually challenged user performing an interaction with a plurality of physical blocks over a surface, wherein the physical blocks are different from each other in at least one of shape, size, form, color, structure, surface texture, tactile indicia, weight, volume, density, or content depicted thereon, where at least one physical block within the plurality of physical blocks is stacked on top of a second physical block within the plurality of physical blocks;

identifying the interaction of the visually challenged user with the physical blocks over the surface within the imaging content based on the physical blocks being different from each other in the at least one of shape, size, form, color, structure, surface texture, tactile indicia, weight, volume, density, or content depicted thereon;

mapping the interaction of the visually challenged user with the physical blocks to a plurality of computing instructions corresponding to the physical blocks;

formulating a plurality of computing statements based on the computing instructions without the visually challenged user typing the computer statements;

causing the computing statements to be saved;

the at least one processor to perform operations further comprising:

requesting a speaker to output an audio content associated with at least one of the plurality of computing statements responsive to the interaction such that the visually challenged user can rearrange or reorder the physical blocks, wherein the audio content includes an audio identifier of the at least one of the plurality of computing statements, wherein the surface comprises a composition area and mapping area;

a first portion of the plurality of physical blocks is located in the composition area;

the plurality of computing statements are mapped and formulated from the first portion of the plurality of physical blocks;

a second portion of the plurality of physical blocks is located in the mapping area, the second portion being a single physical block; and the plurality of computing statements associated are mapped to the single physical block, such that the single physical block represents at least one of a function or class comprising the plurality of computing statements, and wherein the physical blocks have different shapes, each type of shape of the physical blocks representative of a different software element;

wherein the at least one physical block within the plurality of physical blocks is stacked on top of a second physical block within the plurality of physical blocks has a different shape with the second physical block indicate of a different action.

* * * * *

UNITED STATES PATENT AND TRADEMARK OFFICE
CERTIFICATE OF CORRECTION

| | |
|---|---|
| PATENT NO. | : 11,334,326 B2 |
| APPLICATION NO. | : 16/802845 |
| DATED | : May 17, 2022 |
| INVENTOR(S) | : Adrian Andres Rodriguez-Velasquez et al. |

It is certified that error appears in the above-identified patent and that said Letters Patent is hereby corrected as shown below:

On the Title Page

In the Abstract:
- Lines 2 and 3: "The disclosed technology relates to transforming interactions with physical blocks by a human developer" should be -- Systems transform interactions with physical blocks by a human developer --
- Line 8: "For example, the structures, colors, shapes or hardness/softness/squeeze/bend/flex/elastic/shape-memory/rigid properties," should be -- The structures, colors, shapes or hardness/softness/squeeze/bend/flex/elastic/shape-memory/rigid properties, --

Signed and Sealed this
Eleventh Day of October, 2022

*Katherine Kelly Vidal*
Katherine Kelly Vidal
*Director of the United States Patent and Trademark Office*